United States Patent [19]
Kokubu et al.

[11] Patent Number: 5,864,302
[45] Date of Patent: Jan. 26, 1999

[54] TRANSMITTING AND RECEIVING SYSTEM

[75] Inventors: Sadao Kokubu; Hisashi Aoki; Takashi Mizuno; Shinichi Koga, all of Niwa, Japan

[73] Assignee: Kabushiki Kaisha Tokai-Rika-Denki-Seisakusho, Niwa, Japan

[21] Appl. No.: 736,817

[22] Filed: Oct. 25, 1996

[30] Foreign Application Priority Data

Oct. 25, 1995 [JP] Japan ................................. 7-277454

[51] Int. Cl.⁶ ....................................................... G01S 13/00
[52] U.S. Cl. .............................. 340/825.54; 342/825.35; 342/572; 342/573; 342/568; 342/44; 342/51
[58] Field of Search ........................ 340/825.54, 825.35, 340/825.49, 505, 568, 572, 573; 342/44, 51

[56] References Cited

U.S. PATENT DOCUMENTS 4,755,871  7/1988  Morales-Garza et al. ................. 358/84
5,305,008  4/1994  Turner et al. ............................. 342/44

FOREIGN PATENT DOCUMENTS 0 356 334    2/1990  European Pat. Off. .
0 640 517 A1  3/1995  European Pat. Off. .
44 30 360 A  10/1995  Germany .

*Primary Examiner*—Michael Horabik
*Assistant Examiner*—Yonel Beaulien
*Attorney, Agent, or Firm*—Oliff & Berridge, PLC

[57] ABSTRACT

A transmitting and receiving system including, a transponder always maintains a transmission function even if circuit constants of circuit elements are deviated or such circuit constants are shifted in association with temperature changes. The transponder includes a transponder coil electromagnetically coupled to an antenna coil through which a response signal is transmitted, a resonance capacitor, a main modulation circuit including a first modulation capacitor, and a supplemental modulation circuit including a second modulation capacitor whose static capacitance value is different from that of the first modulation capacitor. A response signal is transmitted in changing an impedance of a transmitting and receiving portion by the main modulation circuit when a question signal is received and by the supplemental modulation circuit when a correction command signal is received.

15 Claims, 12 Drawing Sheets

TRANSMITTING AND RECEIVING SYSTEM

BACKGROUND OF THE INVENTION

1. Field of the Invention

This invention relates to a transmitting and receiving system conducting a bi-directional communication between a transmitting and receiving means having an antenna coil and a transponder having a transponder coil electromagnetically coupled to the antenna coil.

2. Description of Related Art

In an automobile, to improve security against stealing, for example, a function such as an electronic key storing an electrical identification code therein is added to an ignition key of the automobile. On the automobile side, a transmitting and receiving Electrical Control Unit (ECU) has an immobilizer function that reads the identification code formed on the ignition key. While the ignition key is inserted in a key hole and manipulated to an ON position (or an Accessory (ACC) position) for engine start, the engine starts only when the code read from the ignition key coincides with the identification code that has been preset.

To realize such a transmitting and receiving system, the system is employed to conduct a bi-directional communication between the transmitting and receiving ECU and the transponder which is disposed on an ignition key side. More specifically, the transmitting and receiving system includes an antenna coil disposed around a key hole on a side of the transmitting and receiving ECU. The system transmits, through this antenna coil, a carrier signal that serves as a power source for the transponder, and a question signal that is modulated with this carrier signal.

The transponder placed on the ignition key side includes: a resonance circuit that has a transponder coil which is electromagnetically coupled to the antenna coil, and a resonance capacitor; a modulation circuit having a circuit element to change an impedance synthesized with the resonance circuit; a transmitting and receiving portion having a power source circuit for obtaining power by rectifying the carrier signal. The identification code stored on the ignition key side is transmitted to the transmitting and receiving ECU from the transponder as a response signal in response to the question signal. The transmitting and receiving portion of the transponder changes an impedance status in response to the question signal generated by a modulation circuit on the transmitting and receiving ECU side through the antenna coil.

Circuit constants of the transponder coil and the resonance capacitor are set to be values satisfying the resonance condition of the resonance circuit corresponding to the carrier signal frequency. The modulation circuit for changing the impedance of the transmitting and receiving portion on the transponder side generally has a serial circuit that includes a modulation capacitor and a switching element which is coupled in parallel to the resonance capacitor of the resonance circuit. The switching element is turned ON and OFF corresponding to the response signal to change the impedance of the transmitting and receiving portion.

However, in actual systems, the impedance change amount of the transmitting and receiving portion may not be ensured adequately due to deviations of circuit constants of components of the transmitting and receiving portion such as the transponder coil, the resonance capacitor, and the modulation capacitor, and due to shifts accompanied by circumstantial temperature changes of those circuit constants. If such an impaired state occurs, the transponder cannot return the response of the response signal, thereby causing a major problem that the transmitting and receiving system itself loses its function.

SUMMARY OF THE INVENTION

It is an object of the invention to provide a transmitting and receiving system in which the impedance change amount of the transmitting and receiving portion is automatically changed corresponding to a receiving state of a response signal on a transmitting and receiving means side.

In one form of the invention, to accomplish the objects above, a transmitting and receiving system includes transmitting and receiving means for transmitting through an antenna coil a question signal modulated with a carrier signal. A transmitting and receiving portion of a transponder includes a resonance circuit that has a transponder coil which is electromagnetically coupled to the antenna coil. The transmitting and receiving portion also includes a resonance capacitor. The transponder coil and the resonance capacitor are used to transmit a response signal back to the transmitting and receiving means side in response to the question signal. The response signal is generated by amplitude modulation of the carrier signal in changing an impedance of the transmitting and receiving portion.

The transmitting and receiving means transmits the question signal modulated with the carrier signal while the transponder coil is electromagnetically coupled to the antenna coil. If the response signal is not received after the transmission of the question signal, the transmitting and receiving means transmits a correction command signal modulated with the carrier signal through the antenna coil. Upon receiving the correction command signal, the transponder executes the response operation of the response signal while the impedance change amount of the transmitting and receiving portion is changed. When the transponder is unable to generate the response signal, an impedance change amount of the transmitting and receiving portion is automatically changed based on the correction command signal received from the transmitting and receiving means. Consequently, a transmission function by the transmitting and receiving portion can be always maintained.

In accordance with an embodiment of the invention, the transmitting and receiving portion includes a first modulating means for changing an impedance by selectively connecting a first modulation capacitor in parallel to the resonance capacitor and a second modulating means for changing an impedance by selectively connecting a second modulation capacitor in parallel to the resonance capacitor. The static capacitance of the second modulation capacitor is different from that of the first modulation capacitor. The transponder operates the first modulating means during the response operation of a response signal in response to the question signal and operates the second modulating means during the response operation of a response signal in response to the correction command signal. Thus, the transponder generates a response signal by changing the impedance of the transmitting and receiving portion using the first or second modulating means.

According to another embodiment of the invention, the transmitting and receiving portion includes a modulating means and a correcting means. The modulating means changes an impedance of the transmitting and receiving portion by selectively connecting a modulation capacitor in parallel to the resonance capacitor during the response operation of a response signal in response to the question signal. The correcting means selectively connects a supplemental capacitor to the resonance capacitor. The transponder changes the impedance change amount of the transmitting and receiving portion by operating the correcting means as well as the modulating means during the response operation of a response signal in response to the correction command signal to maintain normal transmission function.

Moreover, according to a further preferred embodiment, the transmitting and receiving portion includes a first modulating means for selectively connecting a first modulation capacitor in parallel to the resonance capacitor and a second modulating means for selectively connecting a second modulation capacitor in parallel to the resonance capacitor. The static capacitance of the second modulation capacitor is different from that of the first modulation capacitor. The transponder changes the impedance of the transmitting and receiving portion by operating the first modulating means during the response operation of a response signal in response to the question signal, and to change an impedance between states in which the second modulating means is operated and in which both of the first and second modulating means are operated during the response operation of a response signal in response to the correction command signal.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
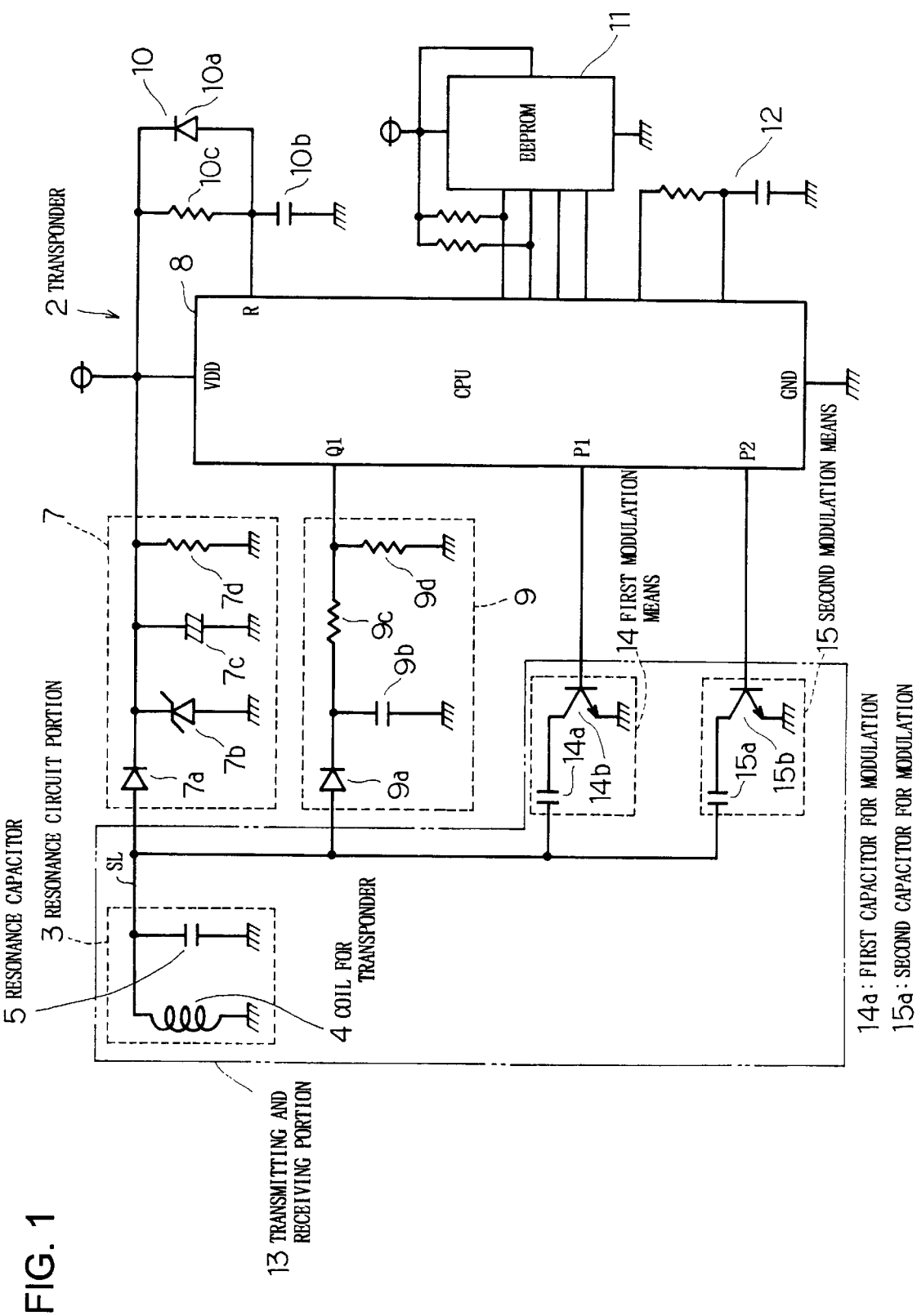
FIG. 1 is a circuit diagram showing a transponder of a first embodiment according to the invention.
Figure 2:
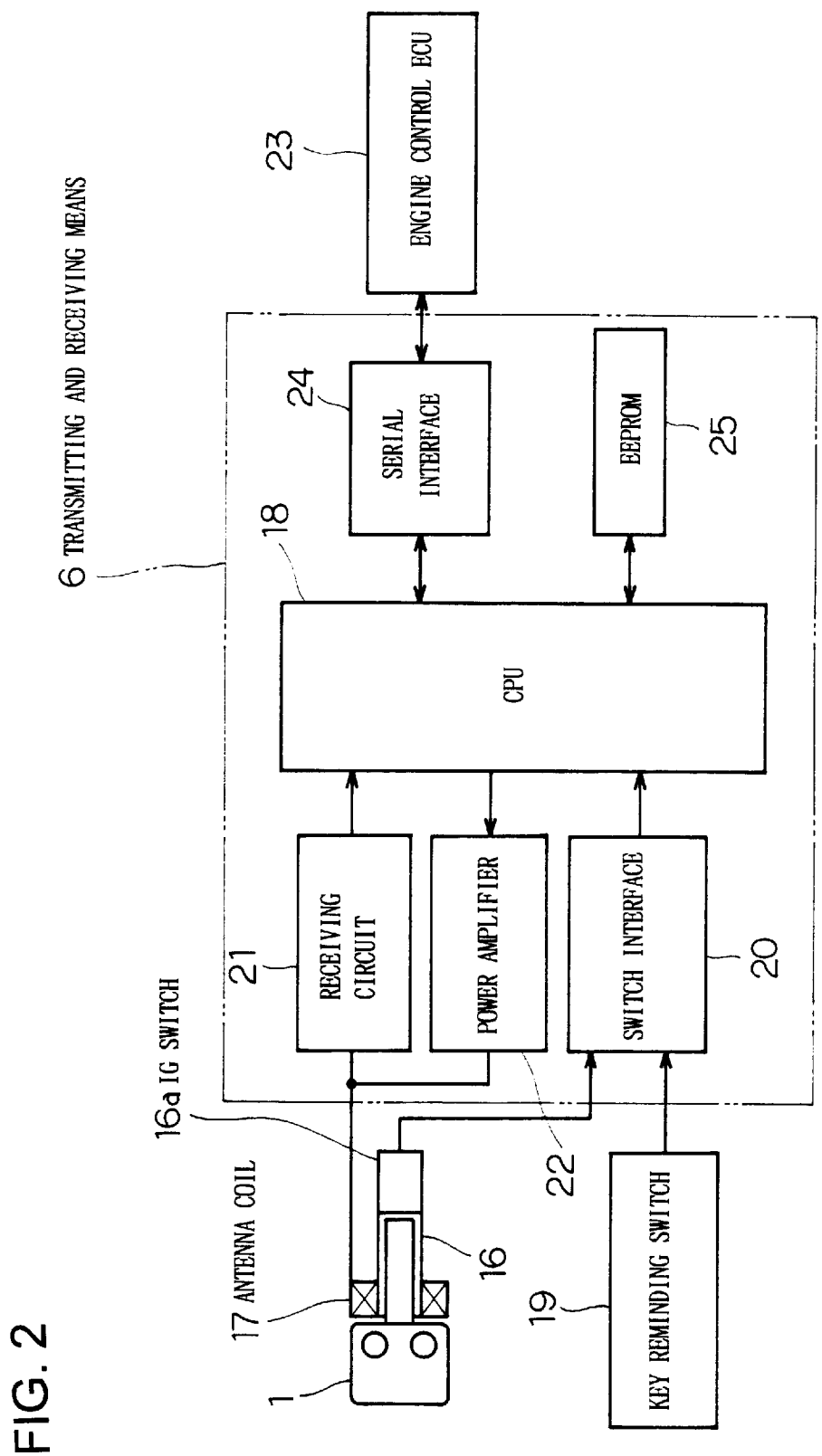
FIG. 2 is a block diagram showing the entire transmitting and receiving system of the first embodiment.

Referring to FIGS. 1 to 6, a first embodiment in which this invention applies to a transmitting and receiving system for automobile is described. In FIG. 1, an electrical diagram of a transponder 2 incorporated in a key grip of an ignition key 1 (as shown by FIG. 2) is shown. A resonance circuit 3 includes a transponder coil 4 and a resonance capacitor 5 coupled in parallel between a signal line SL and a ground terminal. A resonance frequency of the resonance circuit 3 is set to coincide with a frequency of a carrier signal transmitted from a transmitting and receiving ECU 6, as shown in FIG. 2, formed on a side of an automobile, as described below.

A power source circuit 7 is coupled to the signal line SL and feeds a power source terminal VDD of a CPU 8. The power source circuit 7 generates an output by rectifying and smoothing the carrier signal received by the resonance circuit 3. The power source circuit 7 includes a diode 7a for rectification, a diode 7b for maintaining a constant voltage, a capacitor 7c for smoothing, and a resistor 7d for discharge. The components of the power source circuit 7 are coupled as shown in FIG. 1.

A detection circuit 9 is coupled to the signal line SL and feeds effective signal components of a signal received by the resonance circuit 3 to an input port Q1 of the CPU 8. The detection circuit 9 includes a diode 9a for detection, a capacitor 9b, and resistors 9c, 9d, which are coupled as shown in FIG. 1.

A reset circuit 10 provides a power-on reset function. The reset circuit 10 continuously feeds a reset signal to a reset terminal R of the CPU 8 until the output voltage level of the power source circuit 7 increases to at least a predetermined level. The reset circuit 10 includes a diode 10a, a capacitor 10b, and a resistor 10c, which are connected as shown in FIG. 1.

The CPU 8 accesses an EEPROM 11 that contains a unique identification code corresponding to each ignition key 1. A capacitor-resistor (CR) circuit 12 is coupled to the CPU 8 to determine a clock frequency of the CPU 8.

In addition to the resonance circuit 3, the transmitting and receiving portion 13 includes a main modulation circuit 14 which is a first modulating means and a supplemental modulation circuit 15 which is a second modulating means. The main modulation circuit 14 is a first serial circuit that includes a first modulation capacitor 14a serially connected to a collector of an npn type transistor 14b. The first serial circuit is connected in parallel to the resonance capacitor 5 of the resonance circuit 3. The transistor 14b is turned ON and OFF by the CPU 8 through an output port Pi.

The supplemental modulation circuit 15 is a second serial circuit that includes a second modulation capacitor 15a serially connected to a collector of an npn type transistor 15b. The second serial circuit is connected in parallel to the resonance capacitor 5 of the resonance circuit 3. The transistor 15b is turned ON and OFF by the CPU 8 through an output port P2. It is also to be noted that in this embodiment, the ratio of static capacitance values among the resonance capacitor 5, the first modulation capacitor 14a, and the second modulation capacitor 15a is set as, for example, 1:0.1:0.2.

The CPU 8 is placed in an active state by the output of the power source circuit 7 in response to reception of the carrier signal from a transmitting and receiving ECU 6 (see FIG. 2) by the resonance circuit 3. During the active state, when a question signal, as described below, is received through the detection circuit 9, the CPU 8 transmits a response signal that includes an identification code which is stored in the EEPROM 11. The CPU 8 transmits the response signal through the resonance circuit 3 by activating the main modulation circuit 14.

The CPU 8 generates the response signal by amplitude-modulating the received carrier signal. The CPU 8 amplitude-modulates the received carrier signal by turning ON and OFF the transistor 14b in the main modulation circuit 14 which changes the impedance of the transmitting and receiving portion 13. The response signal is received on the side of the transmitting and receiving ECU 6 by the transmitting and receiving ECU 6 detecting the impedance changes of the transmitting and receiving portion 13.

When a correction command signal is received in the received signal through the detection circuit 9 during the active state, the CPU 8 operates the supplemental modulation circuit 15 instead of the main modulation circuit 14 to transmit the response signal which includes the identification code stored in the EEPROM 11. The CPU 8 generates the response signal by amplitude-modulating the received carrier signal. The CPU 8 amplitude-modulates the received carrier signal by turning ON and OFF the transistor 15b in the supplemental modulation circuit 14 which changes the impedance of the transmitting and receiving portion 13. The response signal is received on the side of the transmitting and receiving ECU 6 by the transmitting and receiving ECU 6 detecting the impedance changes of the transmitting and receiving portion 13. It is to be noted that the response signal transmitted as described above can be produced with an arbitrary protection or scramble based on a program in the CPU 8.

In FIG. 2, the entire system is schematically shown with a combination of functional blocks. An antenna coil 17 is disposed around an ignition key cylinder 16 of the automobile. When the ignition key 1 is inserted into the key cylinder 16, the antenna coil 17 and the transponder coil 4 (see, FIG. 1) that is incorporated within the key grip of the ignition key 1 are electromagnetically coupled to each other. The transmitting and receiving ECU 6 serves as transmitting and receiving means in this embodiment and includes an immobilizer function in which the engine is permitted to start by the ignition key 1 only when the identification code in the response signal received from the transponder 2 of the ignition key 1 coincides with the previously set identification code.

The transmitting and receiving ECU 6 includes a CPU 18. An ON signal is supplied to the CPU 18 from an ignition (IG) switch 16a and a key reminding switch 19. The IG switch 16a and the key reminding switch 19 have known structures and are formed corresponding to the ignition key cylinder 16 and are coupled to a switch interface 20. A signal received by the antenna coil 17 is supplied to the CPU 18 through the receiving circuit 21. The CPU 18 transmits through the antenna coil 17 by generating output signals using a power amplifier 22 and transmits and receives signals to and from an engine control ECU 23 through a serial interface 24. The CPU 18 can selectively prohibit the engine start operation through the engine control ECU 23.

The CPU 18 also transmits and receives data to and from the EEPROM 25. The EEPROM 25 stores the same identification code as the identification code stored in the EEPROM 11 located on the side of the ignition key 1. The identification code is stored in the EEPROMS 11 and 25 previous to their operational use in the automobile.

The CPU 18 operates as follows: When an ON signal from the key reminding switch 19 and the IG switch 16a is received, or when the ignition key 1 is inserted to the ignition key cylinder 16 and manipulated to the ON position, the antenna coil 17 and the transponder coil 4 located on the side of the ignition key 1 are electromagnetically coupled to each other. The CPU 18 starts when the above events occur and transmits a carrier signal of a predetermined frequency and a question signal modulated onto the carrier signal in a pulse series form from the antenna coil 17 by operation of the power amplifier 22.

Upon such a signal transmission, as described above, the transponder 2 located on the side of the ignition key 1 replies with a response signal that includes an identification code which is stored in the EEPROM 11. The transponder 2 replies through the transmitting and receiving portion 13 by operation of the main modulation circuit 14 in response to the reception of the question signal.

When receiving the response signal from the side of the ignition key 1 after transmitting the question signal as described above, the CPU 18 judges as to whether the identification code in the response signal coincides with the identification code which is stored in the EEPROM 25. If the codes do not coincide with each other, the CPU 18 prohibits a start of the automobile engine through the engine control ECU 23 and stops the transmission of the carrier signal through the power amplifier 22 and the antenna coil 17. Consequently, when the IG switch 16a is turned on by an improper ignition key 1 whose identification code does not coincide with the identification code stored in the EEPROM 25, the automobile engine is never started, thereby improving security against stealing.

On the other hand, when the received identification code coincides with the identification code stored in the EEPROM 25, the CPU 18 permits a start of the automobile engine through the engine control ECU 23 and stops the transmission of the carrier signal through the power amplifier 22 and the antenna coil 17 after the engine starts. Accordingly, when a proper ignition key 1 whose identification code coincides with the identification code stored in the EEPROM 25 is inserted into the ignition key cylinder 16, the CPU 18 permits the start of the automobile engine through the engine control ECU 23.

When the response signal from the side of the ignition key 1 during a period exceeding a predetermined waiting time after transmitting the question signal as described above is not received, the CPU 18 transmits a carrier signal of a predetermined frequency and a correction command signal modulated onto the carrier signal in a pulse series from the antenna coil 17 by operating the power amplifier 22. If such a signal transmission is done, as described above, the transponder 2 on the side of the ignition key 1 activates the supplemental modulation circuit 15 in response to reception of the correction command signal and re-executes operation to transmit the response signal including an identification code stored in the EEPROM 11 through the transmitting and receiving portion 13.

In sum, according to the structure of this embodiment thus described, the following effects and advantages are obtainable.

Figure 3:
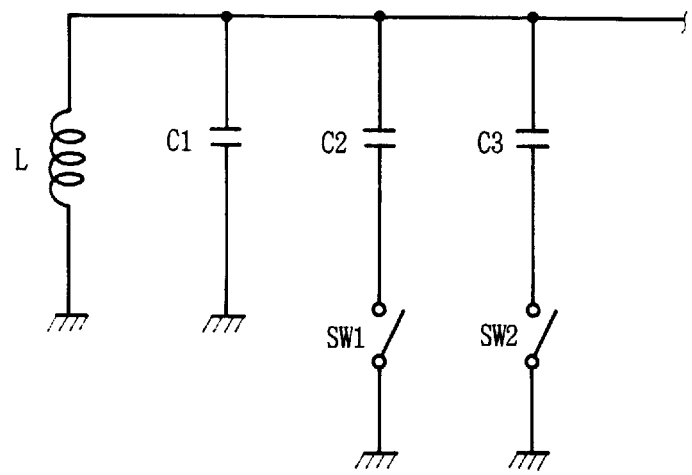
FIG. 3 is an equivalent circuit diagram showing a transmitting and receiving portion in FIG. 1.

A portion of the transmitting and receiving portion 13 incorporated in the transponder 2, or the constitution of parts of the resonance circuit 3, the main modulation circuit 14, and the supplemental modulation circuit 15, is illustrated in an equivalent manner in FIG. 3. L indicates an inductance of the transponder coil 4; C1, C2, C3 indicate static capacitance values of the resonance capacitor 5, the first modulation capacitor 14a, and the second modulation capacitor 15a; SW1 and SW2 indicate switch elements constituted of the transistors 14b, 15b. The static capacitance values of C1, C2, C3 are in a relation of C1>C3>C2 (more specifically, in a relation of about C1:C2:C3=1:0.1:0.2).

Figure 4:
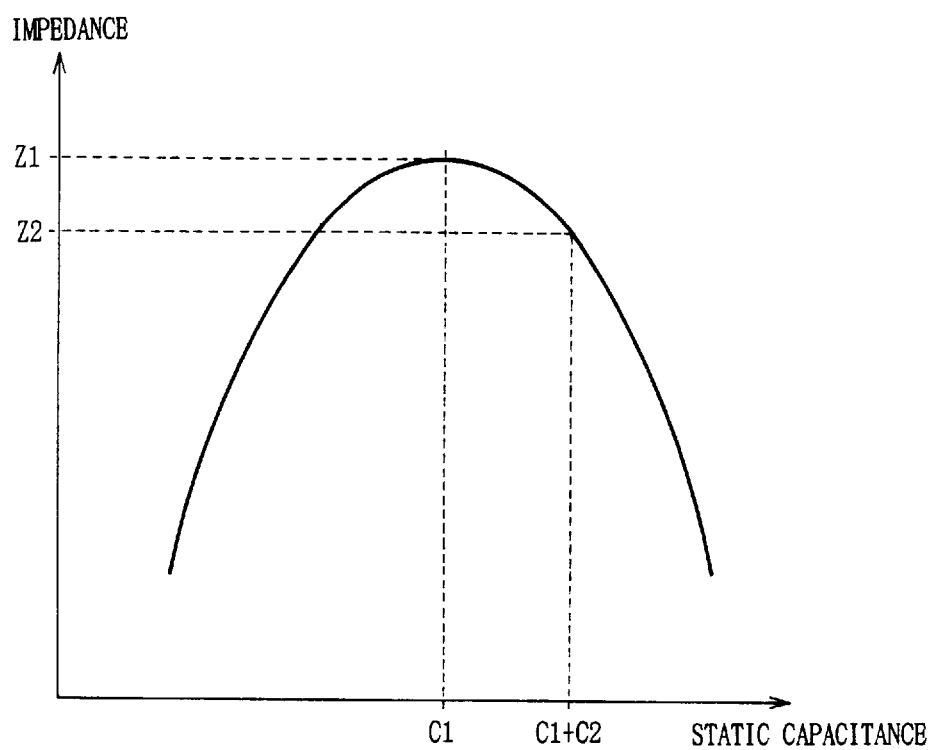
FIGS. 4 to 6 are impedance curve diagrams showing characteristics of the transmitting and receiving portion in FIG. 1.

As shown in FIG. 4, at a stage of designing or manufacturing the transponder 2, the static capacitance C1 is set at a value (or a value to make the resonance circuit 3 enter in a parallel resonance state) to maximize an impedance Z1 of the transmitting and receiving portion 13 (corresponding to an impedance of the resonance circuit 3) with respect to the frequency of the carrier signal transmitted from the transmitting and receiving ECU 6, where the main and supplemental modulation circuits 14, 15 are not operating.

Therefore, when the SW1 is turned on in response to the operation of the main modulation circuit 14, or when the static capacitance of the transmitting and receiving portion 13 is increased to (C1+C2) from C1, an impedance Z2 of the transmitting and receiving portion 13 with respect to the carrier signal (synthesized impedance of the resonance circuit 3 and the first modulation capacitor 14a) is made smaller than the impedance Z1 described above, as shown in FIG. 4. Accordingly, the impedance of the transmitting and receiving portion 13 can be changed by turning ON and OFF the transistor 14b of the main modulation circuit 14. A response signal can therefore be returned from the side of the transponder 2 to the side of the transmitting and receiving ECU 6.

Figure 5:
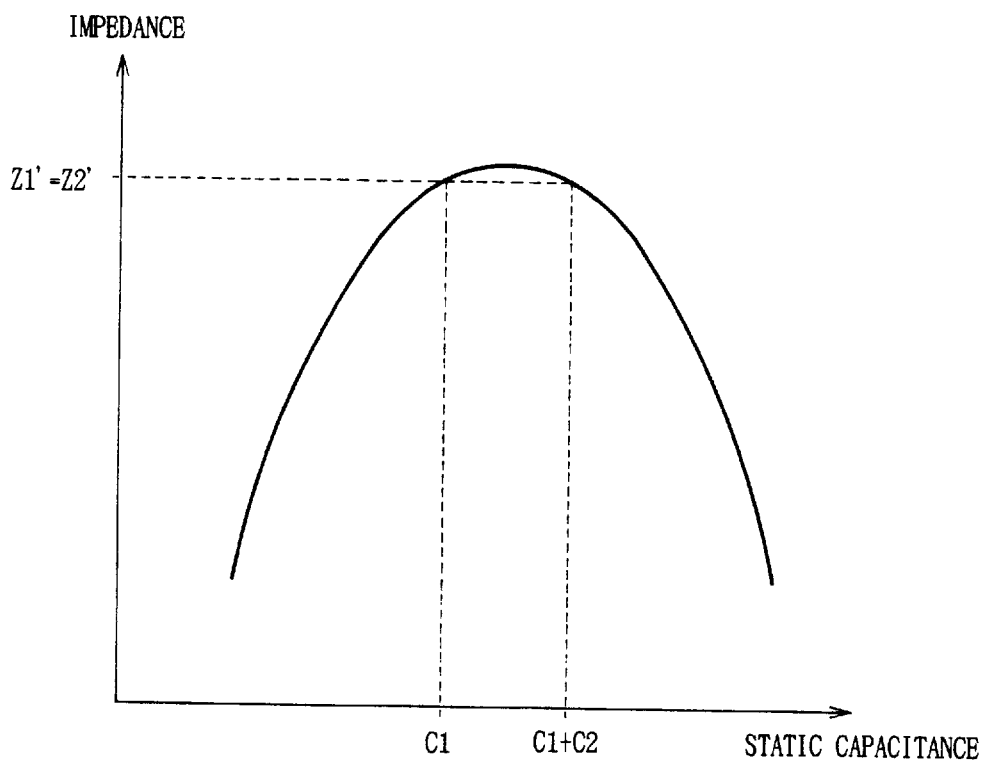

However, with actual products, an impedance change amount (Z1-Z2) of the transmitting and receiving portion 13 may not be adequately ensured due to deviations of circuit constants of the components of the transmitting and receiving portion 13 such as the transponder coil 4, the resonance capacitor 5, and the first modulation capacitor 14a, and due to shifts accompanied by circumstantial temperature changes of those circuit constants. That is, when the impedance of the transmitting and receiving portion 13 changes from Z1 to Z1' when the main modulation circuit 14 and the supplemental modulation circuit 15 are not operating, or when the impedance of the transmitting and receiving portion 13 changes from Z2 to Z2' when the main modulation circuit 14 is operating, the impedances Z1' and Z2' may become substantially the same as one another after those changes, for example, as shown in FIG. 5. In such a situation, transmitting a response signal becomes impossible in response to operation of the main modulation circuit 14.

Hence, in this embodiment, when no response signal is received on the side of the transmitting and receiving ECU 6 during a predetermined waiting time after transmission of the question signal, the correction command signal is transmitted from the transmitting and receiving ECU 6 to the transponder 2. When the correction command signal is received on the side of the transponder 2, the system performs a retransmission operation of the response signal by operating the supplemental modulation circuit 15 instead of the main modulation circuit 14.

Figure 6:
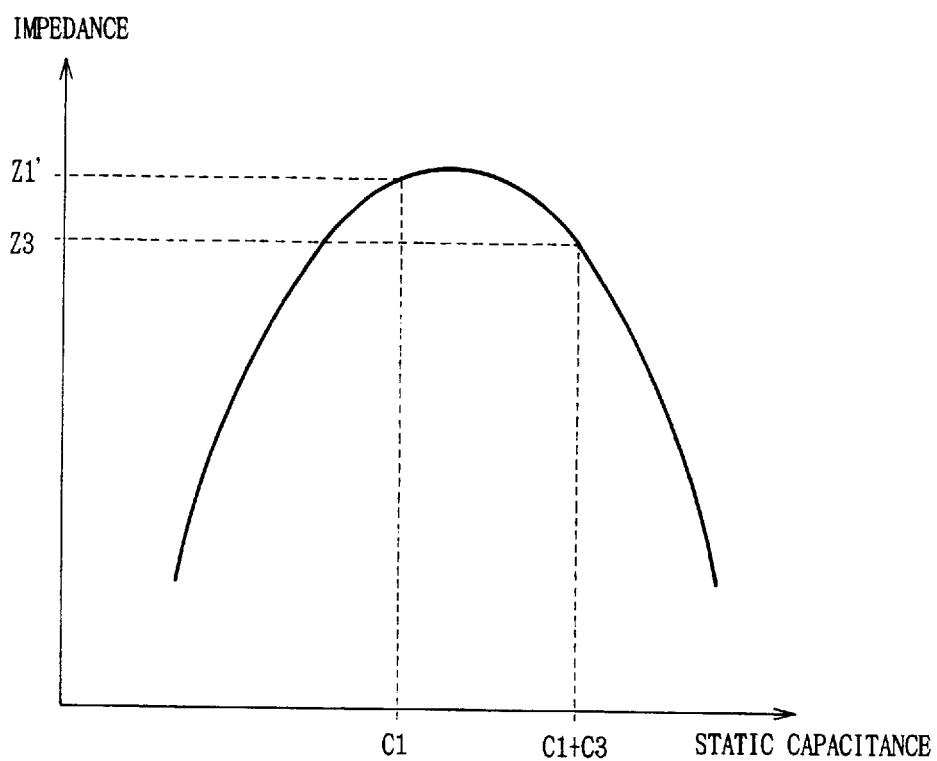

Although the static capacitance of the transmitting and receiving portion 13 may be increased from C1 to (C1+C3) when the SW2 is turned on in response to the operation of the supplemental modulation circuit 15, the impedance Z3 of the transmitting and receiving portion 13 (the synthesized impedance of the resonance circuit 3 and the second modulation capacitor 15a) when the supplemental modulation circuit 15 is operating can be made smaller than the impedance Z1', as shown in FIG. 6, since the static capacitance values of C3, C2 are in a relation of C3>C2 (in the embodiment, in a relation of C3=2×C2) in such a situation.

According to this embodiment, when the impedance change amount of the transmitting and receiving portion 13 moves out of a range due to deviations of circuit constants of the elements of the transmitting and receiving portion 13 of the transponder 2, or due to shifts accompanied with circumstantial temperature changes of those circuit constants, or the like, and the transmitting and receiving portion 13 is incapable of transmitting a response signal, the impedance change amount of the transmitting and receiving portion 13 is automatically changed based on the correction command signal from the side of the transmitting and receiving ECU 6.

Consequently, the system can always maintain a transmission function of the response signal transmitted by the transmitting and receiving portion 13. In this embodiment, when the response signal is generated by the transponder 2, only one of the transistors 14a, 15a is turned ON and OFF, and therefore, it is advantageous that the electricity for such switching (i.e., electricity required to transmit the response signal) can be small.

Figure 7:
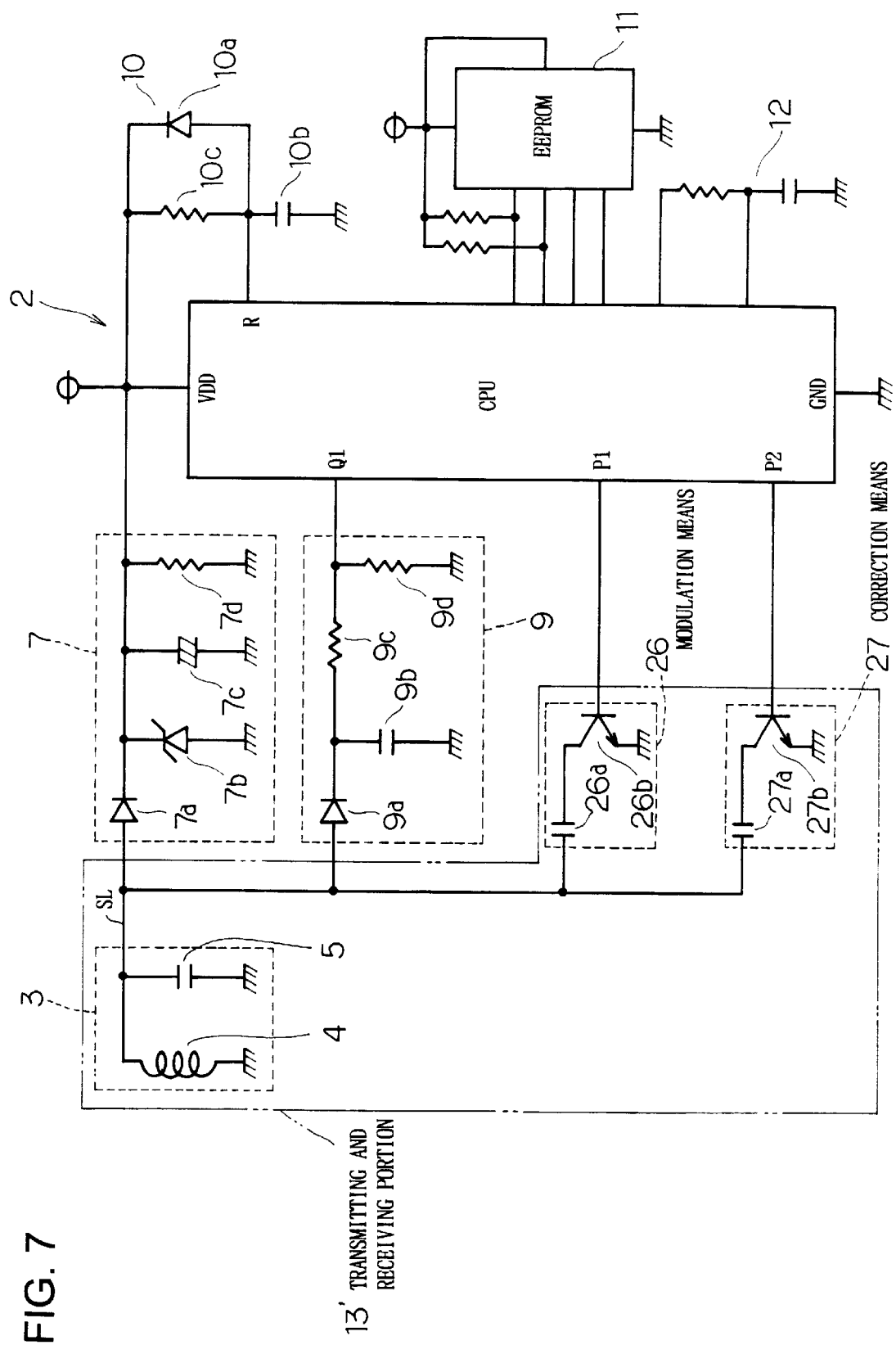
FIG. 7 is a circuit diagram showing a transponder of a second embodiment of the invention.

FIG. 7 shows a second embodiment of the invention. Hereinafter, only portions different from the first embodiment is described. This second embodiment provides a transmitting and receiving portion 13' having the resonance circuit 3, a modulation circuit 26 as a modulating means, and a correction circuit 27 as a correcting means. The modulation circuit 26 couples in parallel a first serial circuit to the resonance capacitor 5 of the resonance circuit 3. The first serial circuit includes a capacitor 26 for modulation serially connected to a collector of an npn type transistor 26b. The transistor 26b can be turned ON and OFF by the CPU 8 through the output port P1.

The correction circuit 27 couples in parallel a second serial circuit to the resonance capacitor 5 of the resonance circuit 3. The second serial circuit includes a supplemental capacitor 27a serially connected to a collector of an npn type transistor 27b. The transistor 27b can be turned ON and OFF by the CPU 8 through the output port P2. It is to be noted that in the second embodiment, the ratio of static capacitance values among the resonance capacitor 5, the capacitor 26a for modulation, and the supplemental capacitor 27a is set to, for example, about 1:0.1:0.1. In other words, the static capacitance values of the capacitor 26a for modulation and the supplemental capacitor 27a are set to be the same value to each other.

In this second embodiment, when the transmitting and receiving ECU 6 transmits the carrier signal causing the CPU 8 to be in an active state (see FIG. 2), and when a question signal is received through the detection circuit 9, the CPU 8 responds by transmitting a response signal that includes an identification code which is stored in the EEPROM 11. The response signal is transmitted through the resonance circuit 3 by activating the modulation circuit 26. That is, the CPU 8 performs response operation of the response signal by turning ON and OFF the transistor 26b in the modulation circuit 26 to change the impedance of the transmitting and receiving portion 13'.

When the correction command signal is received through the detection circuit 9 under such an active state described above, the CPU 8 responds by transmitting the response signal that includes the identification code which is stored in the EEPROM 11. The response signal is transmitted through the resonance circuit 3 by activating the correction circuit 27 as well as the modulation circuit 26. That is, the CPU 8 performs response operation of the response signal by turning ON and OFF the transistor 26b in the modulation circuit 26 and the transistor 27b in the correction circuit 27 at the same time to change the impedance of the transmitting and receiving portion 13'.

Accordingly, in the second embodiment, when the impedance change amount of the transmitting and receiving portion 13' in association with the operation of the modulation circuit 26 moves out of a range due to deviations of circuit constants of the elements of the transmitting and receiving portion 13' or due to shifts accompanied with circumstantial temperature changes of those circuit constants or the like, and the transmitting and receiving portion 13' is incapable of transmitting a response signal, the impedance change amount of the transmitting and receiving portion 13' is automatically changed by operation of both of the modulation circuit 26 and the correction circuit 27 based on the correction command signal from the side of the transmitting and receiving ECU 6. A transmission function of the response signal by the transmitting and receiving portion 13', consequently, can be always maintained as normal in substantially the same manner as that in the first embodiment.

In FIGS. 8 to 12, a third embodiment of the invention is shown to exhibit substantially the same effects as in the first embodiment, and hereinafter, regarding this, only portions different from those in the first embodiment are described.

Figure 8:
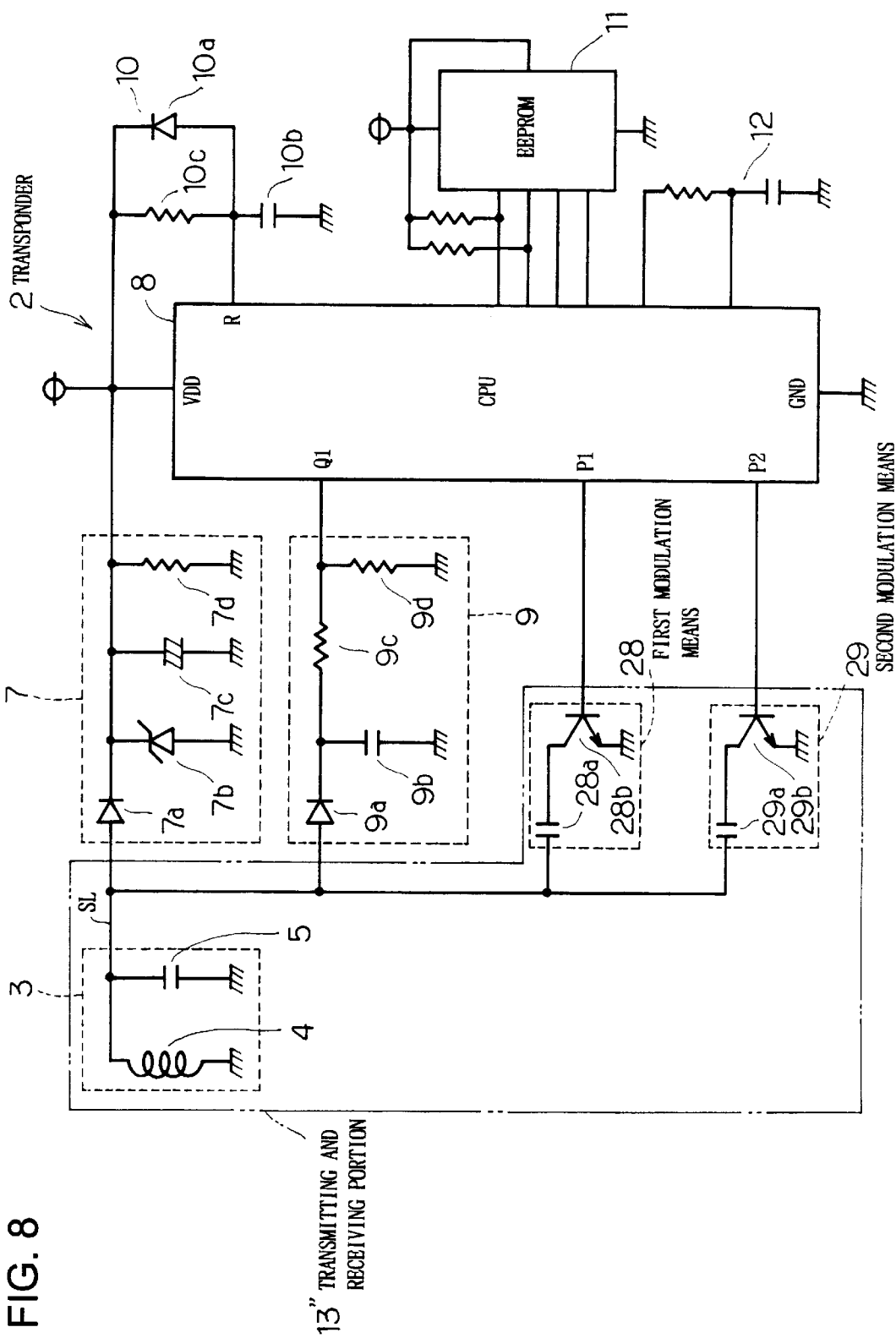
FIG. 8 is a circuit diagram showing a transponder of a third embodiment of the invention.

This third embodiment, as shown in FIG. 8, provides a transmitting and receiving portion 13" having the resonance circuit 3, a first modulation circuit 28 as a first modulating means, and a second modulation circuit 29 as a second modulating means. The first modulating circuit 28 couples a first serial circuit in parallel to the resonance capacitor 5 of the resonance circuit 3. The first serial circuit includes a first capacitor 28a for modulation serially connected to a collector of an npn type transistor 28b. The transistor 28b can be turned ON and OFF by the CPU 8 through the output port P1.

The second modulation circuit 29 couples a second serial circuit in parallel to the resonance capacitor 5 of the resonance circuit 3. The second serial circuit includes a second capacitor 29a for modulation serially connected to a collector of an npn type transistor 29b. The static capacitance value of the second capacitor 29a is different from that of the first modulating means. The transistor 29b can be turned ON and OFF by the CPU 8 through the output port P2.

When the transmitting and receiving ECU 6 transmits the carrier signal (see FIG. 2), the CPU 8 is in an active state and a question signal is received through the detection circuit 9, the CPU 8 responds by transmitting the response signal that includes the identification code which is stored in the EEPROM 11. The response signal is transmitted through the resonance circuit 3 by activating the first modulation circuit 28. That is, the CPU 8 performs response operation of the response signal by turning ON and OFF the transistor 28b in the first modulation circuit 28 to change the impedance of the transmitting and receiving portion 13".

When the correction command signal is received through the detection circuit 9 under such an active state described above, the CPU 8 responds by transmitting the response signal that includes the identification code which is stored in the EEPROM 11 through the resonance circuit 3 by operating the second modulation circuit 29 and by operating both of the first and second modulation circuits 28, 29 to change the impedance of the transmitting and receiving portion 13'. That is, the CPU 8 performs response operation of the response signal by turning ON and OFF the transistor 29b in the second modulation circuit 29 and turning ON and OFF the transistor 29b and the transistor 28b in the first modulation circuit 28 at the same time to change the impedance of the transmitting and receiving portion 13".

Figure 9:
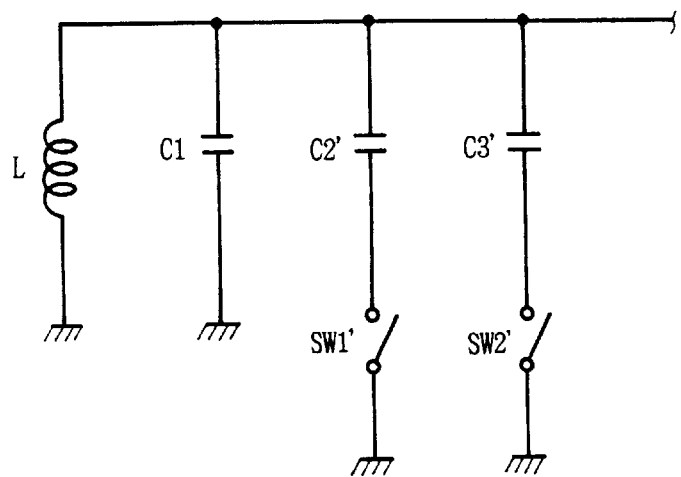
FIG. 9 is an equivalent circuit diagram showing a transmitting and receiving portion in FIG. 8.

With this embodiment, FIG. 9 shows a portion of the transmitting and receiving portion 13" in an equivalent manner. L indicates an inductance of the transponder coil 4; C1, C2', C3' indicate static capacitance values of the resonance capacitor 5, the first capacitor 28a for modulation, and the second capacitor 29a for modulation; SW1' and SW2' represent the transistors 28b, 29b as switch elements. In such a case, the static capacitance values of C1, C2', C3' are in a relation of C1 >C2'>C3' (more specifically, in a relation of about C1:C2':C3'=1:0.2:0.1).

Figure 10:
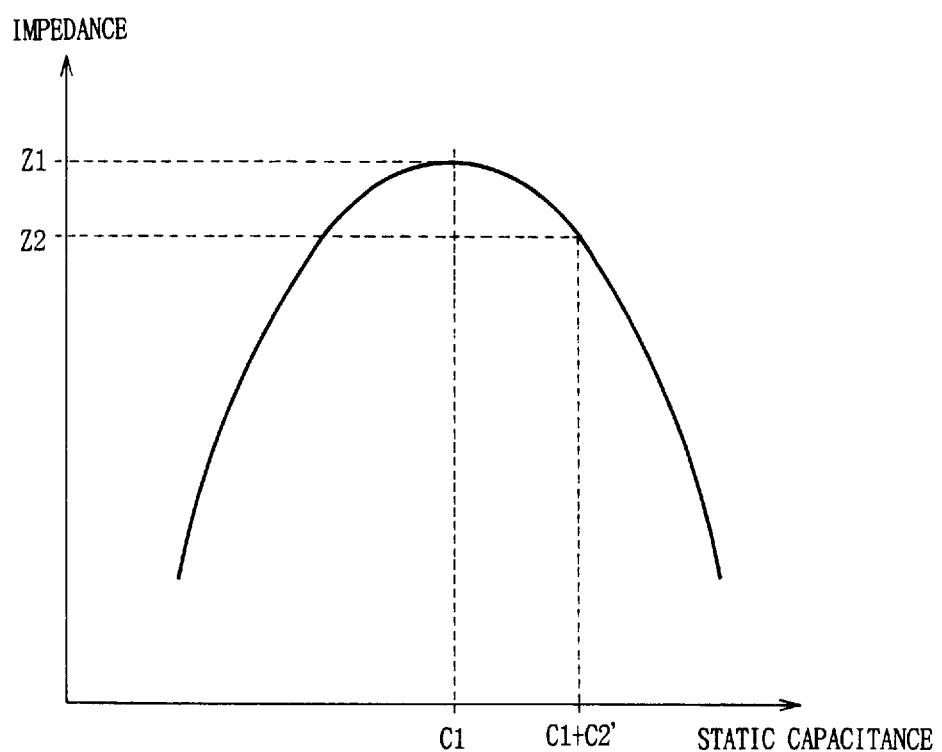
FIGS. 10 to 12 are impedance curve diagrams showing characteristics of the transmitting and receiving portion in FIG. 8.

As shown in FIG. 10, at a stage of designing or manufacturing the transponder 2, the static capacitance C1 is set at a value (or a value to make the resonance circuit 3 enter in a parallel resonance state) to maximize an impedance Z1 of the transmitting and receiving portion 13" with respect to the frequency of the carrier signal transmitted from the transmitting and receiving ECU 6 (corresponding to an impedance of the resonance circuit 3) where the first and second modulation circuits 28, 29 are not operating. Therefore, when SW1' is turned ON in response to the operation of the first modulation circuit 28, or when the static capacitance value of the transmitting and receiving portion 13" is increased to (C1+C2') from C1, an impedance Z2 of the transmitting and receiving portion 13" with respect to the carrier signal (synthesized impedance of the resonance circuit 3 and the first capacitor 28a for modulation) is made smaller than the impedance Z1 described above, as shown in FIG. 10.

Figure 11:
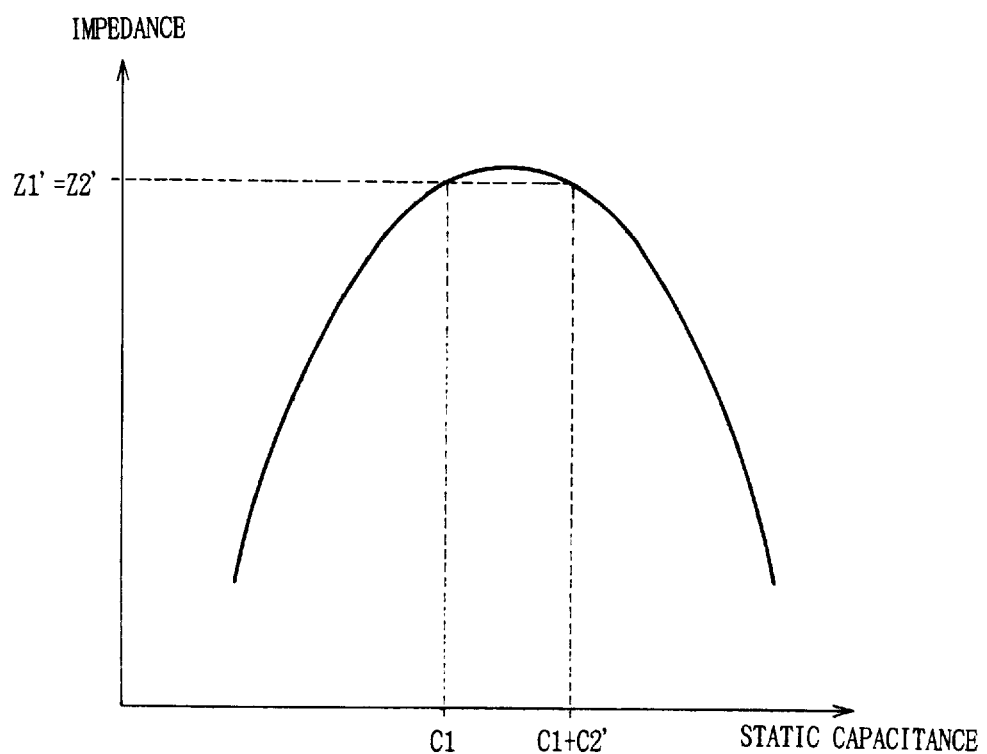

In such a situation, when the impedance of the transmitting and receiving portion 13" changes from Z1 to Z1' when the first modulation circuit 28 and the second modulation circuit 29 are not operating or when the impedance of the transmitting and receiving portion 13" changes from Z2 to Z2' when the first modulation circuit 28 is operating, due to deviations of circuit constants of the respective elements, shifts accompanied with circumstantial temperature changes of those circuit constants, and the like, the impedances Z1', Z2', for example, may become substantially the same as one another after those changes as shown in FIG. 11. In such a situation, transmitting a response signal becomes impossible in response to operation of the first modulation circuit 28.

When the response signal is not generated and when the correction command signal transmitted from the side of the transmitting and receiving ECU 6 is received, the impedance of the transmitting and receiving portion 13" is changed between the states in which the second modulation circuit 29 is operating and in which both of the first and second modulation circuits 28, 29 are operating.

Figure 12:
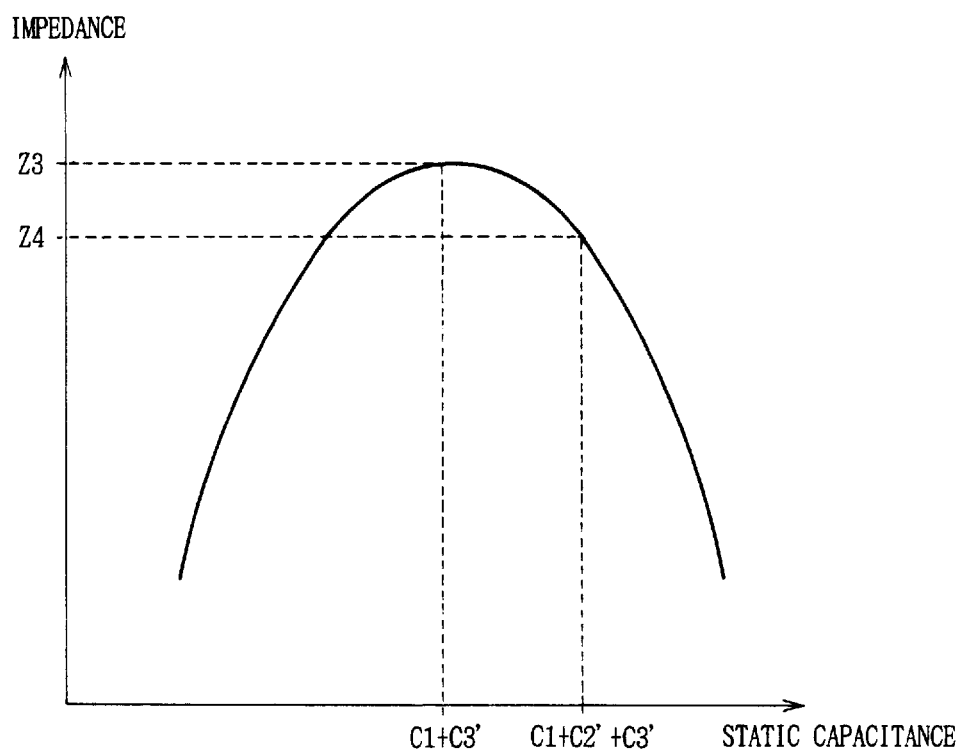

Here, where the SW2' is turned on in association with the operation of the second modulation circuit 29, the static capacitance value of the transmitting and receiving portion 13" becomes (C1+C3'), and the impedance becomes Z3; where the SW1' and SW2' are turned ON at the same time by operating both of the first and second modulation circuits 28, 29, the static capacitance of the transmitting and receiving portion 13" becomes (C1+C2'+C3'), and the impedance becomes Z4. Therefore, as shown in FIG. 12, a change in the impedance of the transmitting and receiving portion 13" can be ensured. In particular, in such a case, ensuring the change in the impedance can be performed with certainty, because the impedance Z3 can be set to a value that is maximized with respect to the frequency of the carrier signal sent from the transmitting and receiving ECU 6.

It is to be noted that this invention is not limited to the embodiment described above and can be enhanced or modified as follows. Functions of the transistors 14b, 15b, 26b, 27b, 28b, 29b of the main modulation circuit 14, the supplemental modulation circuit 15, the modulation circuit 26, the correction circuit 27, the first modulation circuit 28, and the second modulation circuit 29 can be given by switching elements (FET) provided within the CPU 8. Although it is constituted that the impedance is changed by changing the static capacitance of the transmitting and receiving portions 13, 13', 13", the impedance can be changed by changing reactance.

Although in the first embodiment only the supplemental modulation circuit 15 is operated when transponder 2 receives the correction command signal from the transmitting and receiving ECU 6, the main modulation circuit 14 and the supplemental modulation circuit 15 can be operated at the same time. Where the transmitting and receiving ECU 6 transmits a re-correction command signal when the side of the transmitting and receiving ECU 6 does not receive any response signal from the transponder 2 after the transmission of the correction command signal, the system may add a function that a response signal is sent to the transponder 2 by operating both of the main modulation circuit 14 and the supplemental modulation circuit 15 at the same time when the re-correction command signal is received. The invention can apply not only to a transmitting and receiving system for automobile but also widely to a transmitting and receiving system for other purposes.

As apparent from the description above, according to the invention, the impedance change amount of the transmitting and receiving portion is automatically changed according to the receiving state of the response signal on the side of the transmitting and receiving means where the system is formed with a transmitting and receiving means for transmitting the question signal through the antenna coil and with a transponder having a transmitting and receiving portion including a resonance circuit composed of a transponder coil electromagnetically coupled to the antenna coil and a resonance capacitor and where the system is constituted to transmit the response signal by changing the impedance of the transmitting and receiving portion. An advantage can be effectuated in which the transmission function performed by the transmitting and receiving portion can be maintained as normal even when the circuit constants of the transponder coil and the resonance capacitor constituting the transmitting and receiving portion formed on the side of the transponder are deviated or when the circuit constants are shifted in association with changes of temperature.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A transmitting and receiving system, comprising:
    transmitting and receiving means for transmitting a question signal; and
    a transponder that receives the question signal when coupled to the transmitting and receiving means, the transponder generating a response signal with a first change of an impedance value of a transmitting and receiving portion of the transponder in response to the question signal, wherein if the response signal is not received by the transmitting and receiving means after transmitting the question signal, then the transmitting and receiving means transmits a correction command signal and the transponder responds to the correction command signal by generating the response signal with a second change of the impedance value of the transmitting and receiving portion of the transponder.

2. The transmitting and receiving system of claim 1, wherein the transmitting and receiving means transmits the question signal and the correction command signal by modulating a carrier signal while the transponder is electromagnetically coupled to an antenna coil of the transmitting and receiving means.

3. The transmitting and receiving system of claim 2, wherein the transmitting and receiving portion includes a resonance circuit, the resonance circuit comprising:
    a resonance capacitor; and
    a transponder coil, the transponder coil being electromagnetically coupled to the antenna coil of the transmitting and receiving means, wherein the transponder generates the response signal by one of the first and second changes of the impedance of the resonance circuit to amplitude-modulate the carrier signal.

4. The transmitting and receiving system of claim 3, wherein the transmitting and receiving portion further includes:
    first modulating means for changing the impedance of the transmitting and receiving portion by selectively connecting a first modulation device to the resonance circuit; and
    second modulating means for changing the impedance of the transmitting and receiving portion by selectively connecting a second modulation device to the resonance circuit, wherein the transponder generates the response signal by controlling the first modulating means to selectively apply the first change of the impedance of the transmitting and receiving portion in response to the question signal, and generates the response signal by controlling the second modulating means to selectively apply the second change of the impedance of the transmitting and receiving portion in response to the correction command signal.

5. The transmitting and receiving system of claim 4, wherein the first and second modulation devices include a first modulation capacitor and a second modulation capacitor, respectively, the first and second modulating means changing the impedance of the transmitting and receiving portion by connecting the first and second modulation capacitors, respectively, in parallel to the resonance capacitor of the resonance circuit included in the transmitting and receiving portion.

6. The transmitting and receiving system of claim 5, wherein a static capacitance value of the first modulation capacitor is different from a static capacitance value of the second modulation capacitor.

7. The transmitting and receiving system of claim 6, wherein a ratio of the resonance capacitor, the first modulation capacitor and the second modulation capacitor is about 1:0.1:0.2.

8. The transmitting and receiving system of claim 3, wherein the transmitting and receiving portion further includes:
    modulating means for changing the impedance of the transmitting and receiving portion by connecting a modulation device to the resonance circuit; and
    correcting means for changing the impedance of the transmitting and receiving portion by connecting a correcting device to the resonance circuit, wherein the transponder generates the response signal by controlling the modulating means to selectively apply the first change of the impedance of the transmitting and receiving portion in response to the question signal, and generates the response signal by controlling the modulating means and the correcting means to selectively apply the second change of the impedance of the transmitting and receiving portion in response to the correction command signal.

9. The transmitting and receiving system of claim 8, wherein the modulating and correcting devices include a modulation capacitor and a supplemental capacitor, respectively, the modulating and correcting means changing the impedance of the transmitting and receiving portion by connecting the modulation and supplemental capacitors, respectively, in parallel to the resonance capacitor of the resonance circuit included in the transmitting and receiving portion.

10. The transmitting and receiving system of claim 9, wherein a ratio of the resonance capacitor, the modulation capacitor and the supplemental capacitor is about 1:0.1:0.1.

11. The transmitting and receiving system of claim 3, wherein the transmitting and receiving portion further includes:

first modulating means for changing the impedance of the transmitting and receiving portion by connecting a first modulation device to the resonance circuit; and second modulating means for changing the impedance of the transmitting and receiving portion by connecting a second modulation device to the resonance circuit, wherein the transponder generates the response signal by controlling the first modulating means to selectively apply the first change of the impedance of the transmitting and receiving portion in response to the question signal, and generates the response signal by controlling the second modulating means to connect the second modulation device to the resonance circuit and controlling the first modulating means to selectively connect the first modulation device to the resonance circuit to selectively apply the second change of the impedance of the transmitting and receiving portion in response to the correction command signal.

12. The transmitting and receiving system of claim 11, wherein the first and second modulation devices include a first modulation capacitor and a second modulation capacitor, respectively, the first and second modulating means changing the impedance of the transmitting and receiving portion by connecting the first and second modulation capacitors, respectively, in parallel to the resonance capacitor of the resonance circuit included in the transmitting and receiving portion.

13. The transmitting and receiving system of claim 12, wherein a static capacitance value of the first modulation capacitor is different from a static capacitance value of the second modulation capacitor.

14. The transmitting and receiving system of claim 13, wherein a ratio of the resonance capacitor, the first modulation capacitor and the second modulation capacitor is about 1:0.2:0.1.

15. The transmitting and receiving system of claim 1, wherein if the response signal is not received within a predetermined amount of time, then the transmitting and receiving means transmits the correction command signal.

* * * * *